Dec. 24, 1968 H. SCHLEGEL ET AL 3,418,426

REMOVABLE PROTECTIVE COVER FOR TELEVISION HAVING A TINTED PORTION IN THE SCREEN AREA

Filed Dec. 9, 1963 2 Sheets-Sheet 1

INVENTORS
Herbert Schlegel &
Paul Kümmel

BY Spencer & Kaye

ATTORNEYS

INVENTORS
Herbert Schlegel &
Paul Kümmel
BY Spencer & Kaye
ATTORNEYS

United States Patent Office 3,418,426

Patented Dec. 24, 1968

3,418,426

REMOVABLE PROTECTIVE COVER FOR TELEVISION HAVING A TINTED PORTION IN THE SCREEN AREA

Herbert Schlegel, Havelse, Hannover, and Paul Kümmel, Hannover, Germany, assignors to Telefunken Patentverwertungsgesellschaft m.b.H., Ulm, (Danube), Germany Filed Dec. 9, 1963, Ser. No. 328,794

Claims priority, application Germany, Dec. 7, 1962, T 23,155; Oct. 26, 1963, T 24,958

10 Claims. (Cl. 178—7.82)

The present invention relates generally to the portable television receiver art, and, more particularly, to such receivers particularly suited for operation in locations where there is a large amount of local environmental brightness, for example, during daylight with the screen exposed to sunlight.

In this field, the tinting or coloring of a picture tube is performed in such a manner that the coloring provides optimal contrast in a room having a normal amount of light. When a television receiver is operated where there is a large amount of local environmental brightness, particularly when operating the receiver out-of-doors where there is strong sunlight impinging on the screen, this optimum contrast is no longer provided. With such a large amount of light reaching the screen, the entire picture screen is greatly brightened due to the external light so that the screen appears to be bright even when this is not caused internally by the electron beam. Because of this the dark areas of the picture are lost and the contrast of the picture has a range from a bright gray to white rather than the desired range of a very dark gray or black to white.

It is conceivable that the picture screen could be brightened by suitably adjusting the electron beam so that the bright areas of the picture are made sufficiently bright to cause a glare in the eye of the observer. Then, the areas of the picture screen which are bright per se, but which correspond to dark picture areas, are not brightened by the electron beam and therefore appear dark to the eye as a result of the glare due to the portions of the screen brightened by the electron beam. However, the sufficiently great beam power which would be required can not in practice be provided economically.

With the above-discussed prior art in mind, it is a main object of the present invention to increase the contrast of a television receiver when there is a large amount of local environmental brightness.

Another object of the present invention is to provide an improvement in television receivers which yields proper contrast to the screen of a television receiver and without adding appreciable expenditure to the cost of producing such receivers.

A further object of the invention is to provide a device of the character described for restoring to the screen dark picture areas which, due to large local environmental brightness, have lost their relative effect.

Still another object of the invention is to provide a device for television receivers which may, in addition, be used to protect the picture screen when moving the receiver, to magnify the image on the screen, and under certain circumstances, as a base for leveling the receiver.

These objects and others ancillary thereto are accomplished in accordance with preferred embodiments of the invention wherein a portable television receiver is provided with a picture screen which is tinted for providing optimum contrast at normal local environmental brightness. It is to be understood that local environmenttal brightness refers to light which impinges upon the television screen from a source external of the television receiver and this may, for example, be light cast by electric light bulbs within a room where the receiver is being viewed or natural skylight or sunlight when the viewing takes place out-of-doors. The television receiver has a protective hood or cover which may be mounted to the front side of the receiver housing.

In accordance with the present invention the protective hood in the region of the picture screen is transparent and tinted so that the attached hood effects a change in the total coloring. Thus, when there is a change in local environmental brightness, for example, when operating the set during daylight with sunlight impinging on the screen, an improvement in contrast is provided.

The protective hood is constructed so that it may be used as a supporting base when the television receiver is placed on ground which is not level, for example, on a lawn, and during times when an increase in the contrast is not desired. Also, the protective hood may be constructed to magnify the picture on the screen.

Additional objects and advantages of the present invention will become apparent upon consideration of the following description when taken in conjunction with the accompanying drawings in which.

Figure 1:
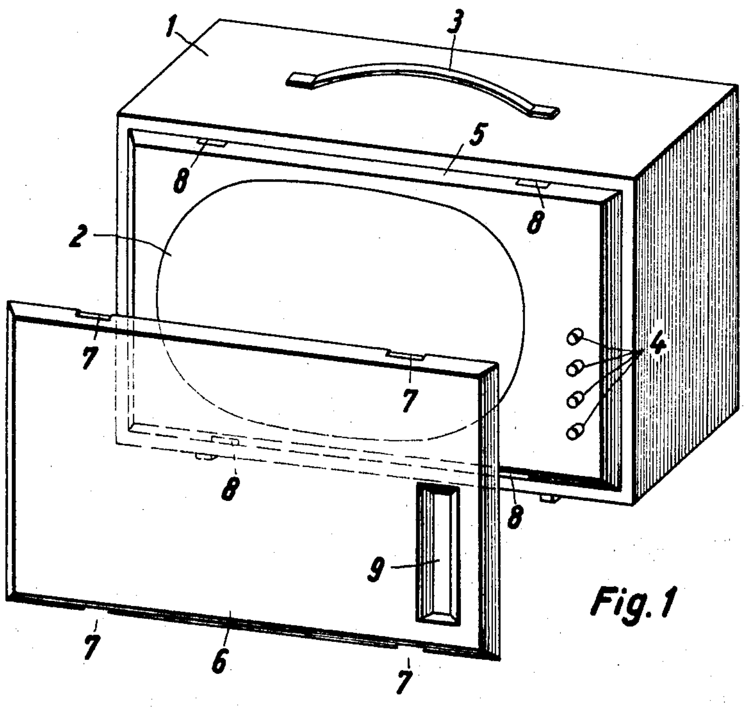
FIGURE 1 is a perspective view of a first embodiment of the invention.

Before considering the present drawings in detail, it should be noted that there may be optical restoring of the dark picture areas, since when there is strong local environmental brightness, a better over-all picture can be provided by tinting the picture screen to be substantially darker. This is true because the light of the local environment must pass through the tinted layer arranged in front of the picture screen or the tinted picture screen of the picture tube twice before, after reflection at the luminescent layer, it is sensed by the eye of an observer. On the other hand, the light of the luminescent layer itself only passes through the tinted layer once to reach the eye of the observer. For example, the light is attenuated by the usual factor 0.7 by means of the tinted layer. The light of the luminescent screen is attenuated only by this factor 0.7, whereas the light of the local environment is provided with an attenuation factor of $(0.7)^2$ which equals about 0.5. Therefore, the brightness of the light of the local environment is weakened to a greater extent than the light of the luminescent layer.

According to the present invention the attenuation of the light is increased at high local environmental brightness by means of a tinted layer of the factor 0.5, for example, the light of the local environment is attenuated by the factor 0.25. The difference between the attenuation of the light from the luminescent screen and the light from the local environment is thus increased advantageously. The receiver may thus be operated by means of the tinted protective hood of the present invention at rather extreme conditions of local environmental brightness. For example, in a darkened room and also in strong sunlight optimum picture impression and optimum contrast will be provided.

As another feature of the present invention the protective hood is arranged to be a magnification lens for the picture of the television receiver. The protective hood of the present invention fulfills several functions simultaneously. First, it protects the television receiver when moving it from place to place; second, when operating the receiver with the protective hood in strong sunlight, a contrast-increasing effect and a restoring of the dark picture areas is provided because of the tinting; third, the protective hood may be used as a supporting base when placing the television receiver on ground which is not level; and, finally, it serves to magnify the picture.

A preferred feature of the invention is the use of an additional pane tinted so that its permeability to the light emanating from the luminescent screen is optimum and having attenuation characteristics adapted to the particular light source. For example, this additional pane or screen may be tinted with the degree of tinting adapted for different brightness values and/or may have selectively properties for different light sources or light sources which are in different portions of the frequency spectrum.

With more particular reference to the drawings, FIGURE 1 shows a television receiver housing 1 having a picture screen 2, a carrying handle 3, and control dials or knobs 4. The front of the housing is surrounded by a projecting rim 5. A protective hood 6 may be attached to the front of the housing. After being placed on the housing this hood locks thereto in a flush manner. The locking is provided by extensions 7 which may be pressed out of the material of the hood and which are disposed in recesses 8 in the projecting rim 5. The protecting hood is provided with a cut-out 9 in a portion thereof corresponding to the location of the operating knobs 4. The operating knobs 4 are thus accessible through this cut-out portion.

The protective hood is transparent over its entire area and is tinted to a degree of darkness such that when strong light impinges upon the picture screen 2, for example strong sunlight, a better picture impression is provided by means of the protective hood in comparison to viewing the picture without the protective hood. The areas of the picture screen which are not brightened by the electron beam will appear dark to a viewer. This protective hood 6 may also be arranged so that it is transparent only in the portion thereof corresponding with the picture screen 2 and may be apaque at the other regions. Also, the protective hood may be constructed to cover only the picture screen 2 and not the dials 4. This hood 6 may be of sufficient size, strength and rigity so that when placing the receiver upon ground which is uneven as, for example a lawn, it may be used as a supporting base for the television receiver housing at a time when a darkening of the picture screen or increase of the contrast thereof is not desired or required.

The protective hood 6 may be provided with an opening in the area thereof which corresponds to the picture screen 2 and into which transparent and differently tinted plates may be inserted. By this means it is possible to provide several and differently tinted plates and these may be carried together with the receiver housing and the protective hood. That screen which provides optimum picture impression at any particular time may then be inserted into the protective hood. Also, in order to achieve optimum optical effects several equally tinted screens may be inserted, the effects of which are added to each other.

The protective hood may be constructed of Plexiglas or safety glass, or polyvinyl chloride, for example one sold under the trade name of Makrolon. The protective hood may also be constructed of a plastic frame into which a tinted glass plate is fixedly inserted. This has the advantage that the plate which is positioned in front of the picture screen can not be as easily damaged or scratched by sharp objects, because glass has a substantially higher degree of hardness than any plastic resin.

Figure 2:
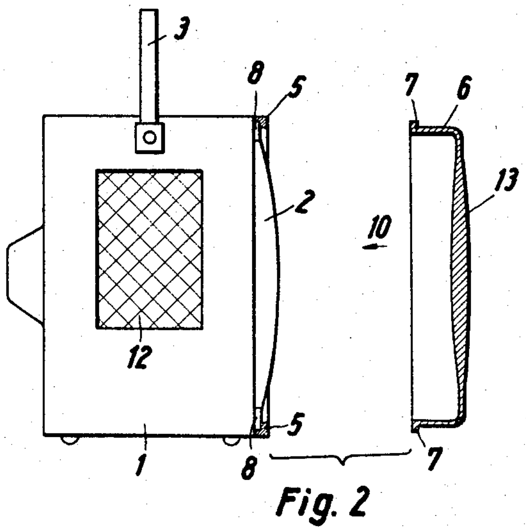
FIGURE 2 is a side elevational view, partly in section, of another embodiment of the invention.

In FIGURE 2 those parts which are similar to those shown in FIGURE 1 are provided with the same reference numerals. The television receiver housing 1 is provided with a picture screen 2, a carrying handle 3, and a loudspeaker opening 12, shown diagrammatically as being covered with a grill cloth or the like. The front of the housing is provided with a rim 5 extending along the periphery thereof. This rim is provided with recesses 8 in the portion of the rim which faces the screen 2. At the front of the housing 1 a protective hood 6 may be attached and this hood is provided in the area 13 thereof as a magnifying lens. Protective hood 6 is provided with projections 7 on its outer periphery which, when attaching the protective hood 6 and moving it in the direction of arrow 10 toward the housing 1, lock with the recesses 8 in the housing 1, it being noted that there is some resiliency to the materials used. The protective hood is also tinted in the region 13 in order to increase the contrast of the picture produced by the picture tube 2, particularly when the set is to be operated in bright surroundings.

Figure 3:
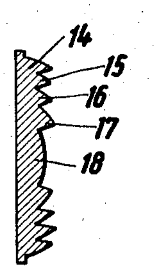
FIGURE 3 is a fragmentary sectional view of a modification of the protective hood of the instant invention.

FIGURE 3 shows diagrammatically the construction which may be used in a protective hood arranged with a so-called echelon lens or Fresnel lens. Such a lens is constructed of several concentric rings 14 through 18 of different shape. The protective hood 6 is preferably made of plastic, for example, polyvinyl chloride.

Figure 4:
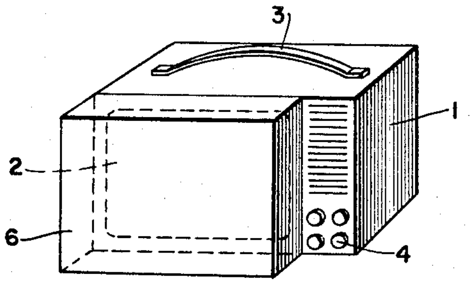
FIGURE 4 is a perspective view of another embodiment of the invention.

FIGURE 4 shows a protective hood 6 which covers only the picture screen 2. All the control dials or knobs 4 remain uncovered and may be operated without removing the protective hood and without providing a cut-out therein.

Figure 5:
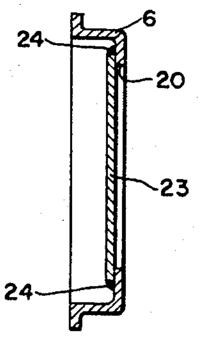
FIGURE 5 is a sectional view of a further embodiment of the invention.

In FIGURE 5 there is shown a protective hood 6 having an opening 20 wherein a tinted glass pane 23 is fixedly inserted. For example, the pane 23 is cemented or welded to the protective hood 6 at portions indicated by 24.

Figure 6:
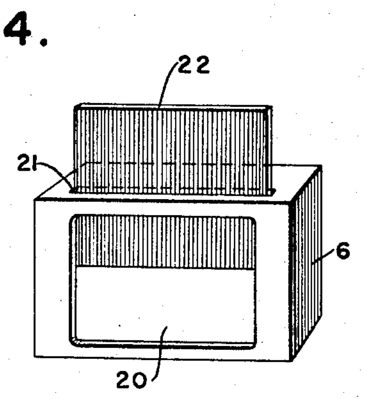
FIGURE 6 is a perspective view of one form of the protective hood adapted to receive different tinted screens.

FIGURE 6 shows a protective hood 6 having an opening 20 in the portion thereof corresponding with the picture screen 2. The protective hood 6 also contains a slot 21 wherein differently tinted screens 22 may be inserted for effecting different values of attenuation of the light according to the respective illumination and the contrast desired.

Figure 7:
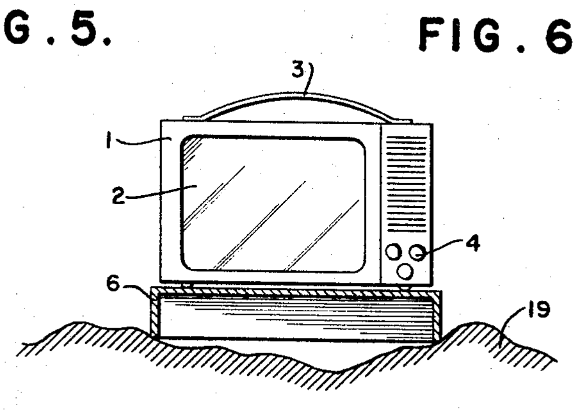
FIGURE 7 shows another possible employment of the protective hood.

FIGURE 7 shows how the protective hood 6 can be used as a supporting base when placing the housing 1 on uneven ground 19 thus preventing the housing of the receiver from undesirably shaking on the ground. The hood 6 is of sufficient size and strength to support the receiver 1.

One practical protective hood suitable for receivers operated both indoors and outdoors was tinted in such a way that, at a cathode-ray beam current of 500 $\mu$a., the intensity of the light produced on the screen was reduced by the protective hood from 260 lux to 116 lux.

It will be understood that the above description of the present invention is susceptible to various modifications, changes, and adaptations, and the same are intended to be comprehended within the meaning and range of equivalents of the appended claims.

What is claimed is:

1. In a portable television receiver device having controls and a tinted picture screen arranged for optimum contrast at normal local environmental brightness and including a protective hood having means for cooperating with the receiver housing for attaching the hood to the front of the receiver housing and serving as protection during transport, the improvement wherein said protective hood covers the front of the housing to protect it and has its protective portion disposed outside the confines of such housing, and is transparent in the portion thereof corresponding to the picture screen and includes a tinted portion so that the attached hood changes the total tinting observed by a viewer and an improvement in contrast is provided when there is a change from the normal local environmental brightness such as when operating the set in daylight with sunlight impinging on the screen.

2. A device as defined in claim 1 wherein said protective hood is provided with projections at the periphery thereof, said housing including recesses arranged to correspond with said projections so that when the protective hood is attached to the receiver the projections engage said recesses and hold the hood onto the receiver.

3. A device as defined in claim 1 wherein said protective hood has an opening in the portion thereof corresponding with the picture screen, and further comprising a set of differently tinted screens arranged to be selectively inserted into said opening to define said tinted portion.

4. A device as defined in claim 1 wherein said protective hood includes a plastic frame and a tinted glass pane fixedly inserted into said frame to define said tinted portion.

5. A device as defined in claim 1 wherein said protective hood is of sufficient size and strength to be used as a supporting base when placing the receiver housing on uneven ground.

6. A device as defined in claim 1 wherein said protective hood is constructed of polyvinyl chloride.

7. A device as defined in claim 1 wherein said protective hood is constructed of safety glass.

8. A device as defined in claim 1 wherein said protective hood in the portion thereof which corresponds to the picture screen is constructed as a magnifying lens.

9. A device as defined in claim 8 wherein said portion of the protective hood corresponding with the picture screen is a Fresnel lens.

10. In a portable television receiver device having controls and a tinted picture screen arranged for optimum contrast at normal local environmental brightness and including a protective hood having means for cooperating with the receiver housing for attaching the hood to the front of the receiver housing and serving as protection during transport, the improvement wherein said protective hood is transparent in the portion thereof corresponding to the picture screen and includes a tinted portion so that the attached hood changes the total tinting observed by a viewer and an improvement in contrast is provided when there is a change from the normal local environmental brightness such as when operating the set in daylight with sunlight impinging on the screen, said protective hood covering the entire front of the receiver housing and being provided with a cut-out in a portion thereof corresponding to the controls of the receiver and through which the controls of the receiver are accessible when the hood is on the receiver.

References Cited

UNITED STATES PATENTS

| | | | |
|---|---|---|---|
| 2,586,716 | 2/1952 | Ried | 178—7.82 |
| 2,692,983 | 10/1954 | Eisenkramer | 178—7.82 |
| 3,078,343 | 2/1963 | Shulz | 178—7.85 |
| 3,146,305 | 8/1964 | Monaco | 178—7.82 |
| 2,260,228 | 10/1941 | Moller | 88—57 |
| 2,470,620 | 5/1949 | Jackson | 178—7.82 |
| 2,525,921 | 10/1950 | Madan | 178—7.85 |
| 2,678,860 | 5/1954 | Peterson | 178—7.9 |
| 2,706,930 | 4/1955 | Jansen | 178—7.85 |
| 2,837,734 | 6/1958 | Bowie | 178—7.82 |
| 3,087,013 | 4/1963 | Stastny | 178—7.9 |
| 3,121,773 | 7/1964 | Jacobi | 178—7.82 |

OTHER REFERENCES

A New Flat Plastic Lens, Electronic Engineering, May 1950, p. 189.

ROBERT L. GRIFFIN, *Primary Examiner.*

J. A. ORSINO, *Assistant Examiner.*

U.S. Cl. X.R.

178—7.85, 7.86, 7.9